(12) United States Patent
Kolesinski (10) Patent No.: US 11,158,201 B1
(45) Date of Patent: Oct. 26, 2021

(54) GRAPHICAL DEPICTION OF INSUFFICIENT SYSTEM INTEGRITY FOR LOW-VISIBILITY SYNTHETIC VISION SYSTEM TAXI MODE

(71) Applicant: Rockwell Collins, Inc., Cedar Rapids, IA (US)

(72) Inventor: Marcin Kolesinski, Central City, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 55 days.

(21) Appl. No.: 16/674,971

(22) Filed: Nov. 5, 2019

(51) Int. Cl.
  *G08G 5/06* (2006.01)
  *G01S 19/42* (2010.01)
  *B64D 43/00* (2006.01)

(52) U.S. Cl.
  CPC ............ *G08G 5/065* (2013.01); *B64D 43/00* (2013.01); *G01S 19/42* (2013.01)

(58) Field of Classification Search
  CPC .. G08G 5/0008; G08G 5/0013; G08G 5/0078; G08G 5/0091; G08G 5/025; G08G 5/045; G08G 5/065; G08G 5/0021; G01S 19/42; B64D 43/00; G01C 23/00; G01C 23/005
  See application file for complete search history.

(56) References Cited

U.S. PATENT DOCUMENTS

| | | | |
|---|---|---|---|
| 5,714,948 A | 2/1998 | Farmakis et al. | |
| 6,812,858 B2 | 11/2004 | Griffin, III | |
| D615,100 S | 5/2010 | Canu-Chiesa | |
| 7,940,210 B2 | 5/2011 | Fly et al. | |
| 8,396,616 B1* | 3/2013 | Barber | G08G 5/0021 701/14 |
| 8,849,477 B2 | 9/2014 | Brinkman | |
| 10,001,376 B1* | 6/2018 | Tiana | G01C 23/005 |
| 2005/0192738 A1* | 9/2005 | Conner | G08G 5/025 701/120 |
| 2011/0231096 A1 | 9/2011 | Ridenour | |
| 2013/0113819 A1 | 5/2013 | Gurusamy | |
| 2016/0012732 A1* | 1/2016 | Shanbhag | G08G 5/0052 701/120 |
| 2016/0196754 A1* | 7/2016 | Surace | G08G 5/0013 701/117 |

(Continued)

OTHER PUBLICATIONS

Extended Search Report for European Application No. 20205987.9 dated Mar. 30, 2021, 9 pages.

(Continued)

*Primary Examiner* — Orlando Bousono
(74) *Attorney, Agent, or Firm* — Suiter Swantz pc llo (57) ABSTRACT

A graphical depiction of insufficient system integrity for low-visibility synthetic vision system taxi mode is disclosed. The graphical depiction may be configured to be displayed on a display device of an aircraft. The graphical depiction may include an aircraft ownship symbol. The aircraft ownship symbol may be modified following a receipt of one or more signals related to a location of the aircraft relative to an aircraft movement surface and a comparison to the one or more signals to one or more thresholds. The comparison may be configured to determine whether there is insufficient system integrity in a degree of confidence in the location of the aircraft relative to the airport movement surface.

14 Claims, 7 Drawing Sheets

(56) References Cited

U.S. PATENT DOCUMENTS

2017/0261335 A1    9/2017  Hoffman et al.
2018/0233052 A1*   8/2018  Shamasundar ...... G08G 5/0013

OTHER PUBLICATIONS

Hiltunen Danielle et al: "Cockpit Display of Traffic Information (CDT!) and Airport Moving Map Industry Survey", Aug. 1, 2016 (Aug. 1, 2016), XP055784896, Retrieved from the Internet: URL:https://rosap.ntl.bts.gov/view/dot/123 57/dot 12357 DSI.pdf[retrieved on Mar. 11, 2021 ] p. 109, p. 147, p. 199.

* cited by examiner

GRAPHICAL DEPICTION OF INSUFFICIENT SYSTEM INTEGRITY FOR LOW-VISIBILITY SYNTHETIC VISION SYSTEM TAXI MODE

BACKGROUND

Aircraft employ synthetic vision systems (SVS) in low-visibility situations to assist in determining the location of the aircraft during taxiing. A low-visibility situation may prevent crew members from being able to see airport movement surfaces via line-of-sight through the windows during taxiing.

SUMMARY

A graphical depiction of insufficient system integrity for low-visibility synthetic vision system taxi mode is disclosed, in accordance with one or more embodiments of the disclosure. The graphical depiction may be configured to be displayed on a display device of an aircraft. The graphical depiction may include an aircraft ownship symbol. The aircraft ownship symbol may be modified following a receipt of one or more signals related to a location of the aircraft relative to an aircraft movement surface and a comparison to the one or more signals to one or more thresholds. The comparison may be configured to determine whether there is insufficient system integrity in a degree of confidence in the location of the aircraft relative to the airport movement surface.

A method is disclosed, in accordance with one or more embodiments of the disclosure. The method may include, but is not limited to, receiving one or more signals related to a location of an aircraft relative to an airport movement surface. The method may include, but is not limited to, comparing the one or more signals to one or more thresholds. The comparison may be configured to determine whether there is insufficient system integrity in a degree of confidence in the location of the aircraft relative to the airport movement surface. The method may include, but is not limited to, modifying an aircraft ownship symbol on a display device of the aircraft based on the comparison.

In some embodiments, the aircraft ownship symbol may include an interior portion having a first color when there is sufficient system integrity in the degree of confidence in the location of the aircraft relative to the airport movement surface.

In some embodiments, the interior portion of the aircraft ownship symbol may be opaque when there is sufficient system integrity in the degree of confidence in the location of the aircraft relative to the airport movement surface. The modifying the aircraft ownship symbol may include changing the interior portion to be translucent when the comparison indicates there is insufficient system integrity in the degree of confidence in the location of the aircraft relative to the airport movement surface.

In some embodiments, the modifying the aircraft ownship symbol may include changing the interior portion from the first color to at least a second color when the comparison indicates there is insufficient system integrity in the degree of confidence in the location of the aircraft relative to the airport movement surface.

In some embodiments, the modifying the aircraft ownship symbol may include animating the interior portion when the comparison indicates there is insufficient system integrity in the degree of confidence in the location of the aircraft relative to the airport movement surface.

In some embodiments, the animation of the interior portion may include at least one of a flashing, a blinking, or a pulsing.

In some embodiments, the interior portion of the aircraft ownship symbol may be bounded by an outline having a second color when there is sufficient system integrity in the degree of confidence in the location of the aircraft relative to the airport movement surface.

In some embodiments, the modifying the aircraft ownship symbol may include removing the outline bounding the interior portion when the comparison indicates there is insufficient system integrity in the degree of confidence in the location of the aircraft relative to the airport movement surface.

In some embodiments, the modifying the aircraft ownship symbol may include changing the outline from the second color to at least a third color when the comparison indicates there is insufficient system integrity in the degree of confidence in the location of the aircraft relative to the airport movement surface.

In some embodiments, the modifying the aircraft ownship symbol may include segmenting the outline when the comparison indicates there is insufficient system integrity in the degree of confidence in the location of the aircraft relative to the airport movement surface.

In some embodiments, the modifying the aircraft ownship symbol may include animating the outline when the comparison indicates there is insufficient system integrity in the degree of confidence in the location of the aircraft relative to the airport movement surface.

In some embodiments, the animation of the outline may include at least one of a flashing, a blinking, or a pulsing.

In some embodiments, the display device of the aircraft including the aircraft ownship symbol may be a primary display device of the aircraft. The modifying the aircraft ownship symbol may include pairing modifications to one or more secondary symbols or one or more textual indicators displayed on a secondary display device of the aircraft. The one or more secondary symbols or one or more textual indicators may be configured to define the insufficient system integrity in the degree of confidence in the location of the aircraft relative to the airport movement surface.

In some embodiments, the one or more signals may include a global positioning system (GPS) signal. The one or more thresholds may include a horizontal figure of merit threshold.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Reference will now be made in detail to the subject matter disclosed, which is illustrated in the accompanying drawings.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

FIGS. 1A-5 generally illustrate a graphical depiction of insufficient system integrity for low-visibility synthetic vision system taxi mode, in accordance with one or more embodiments of the disclosure.

Figure 1A:
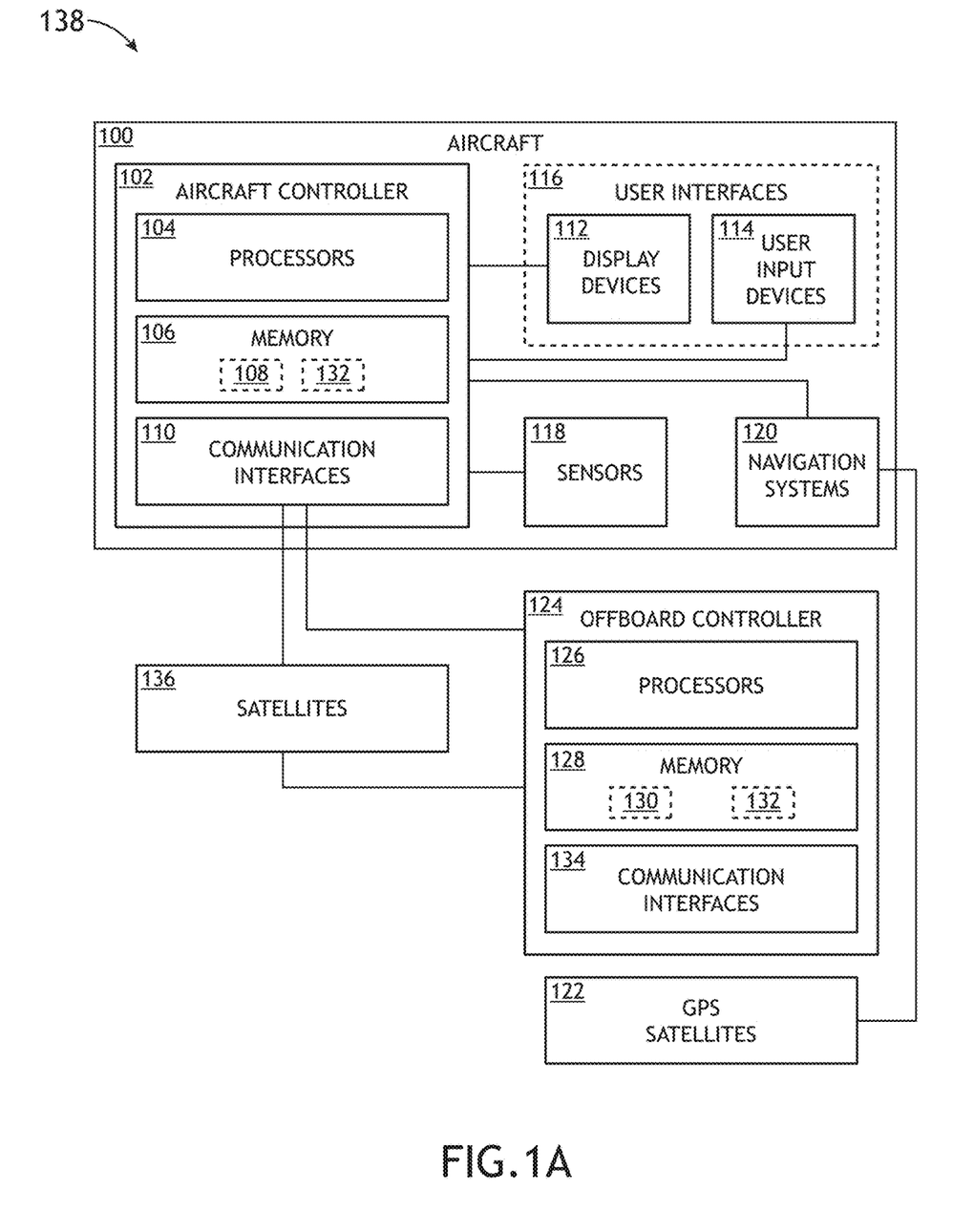
FIG. 1A is a block diagram of a system including an aircraft in which a graphical depiction of insufficient system integrity for low-visibility synthetic vision system taxi mode may be displayed, in accordance with one or more embodiments of the disclosure.
Figure 1B:
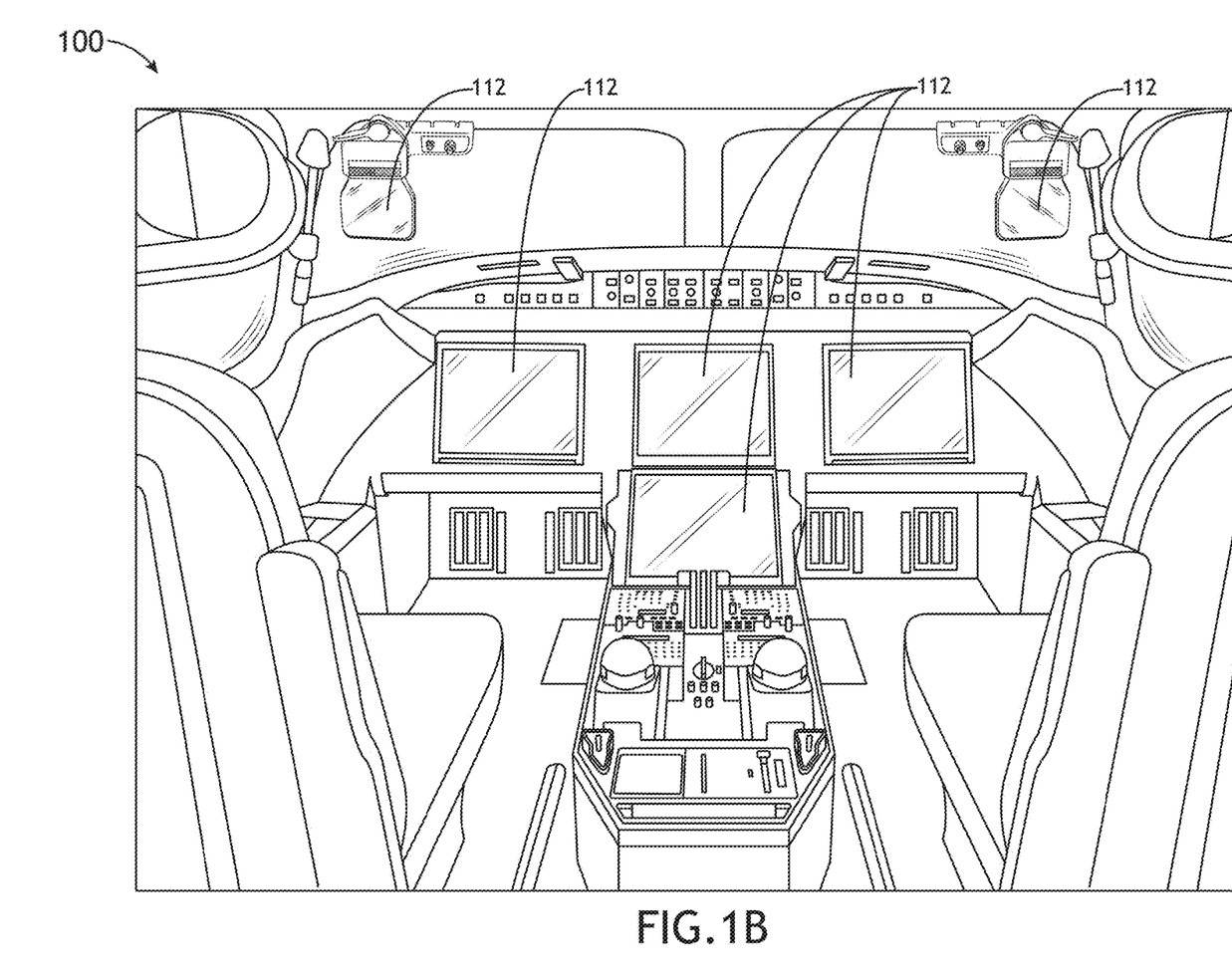
FIG. 1B is an aircraft in which a graphical depiction of insufficient system integrity for low-visibility synthetic vision system taxi mode may be displayed, in accordance with one or more embodiments of the disclosure.
Figure 1C:
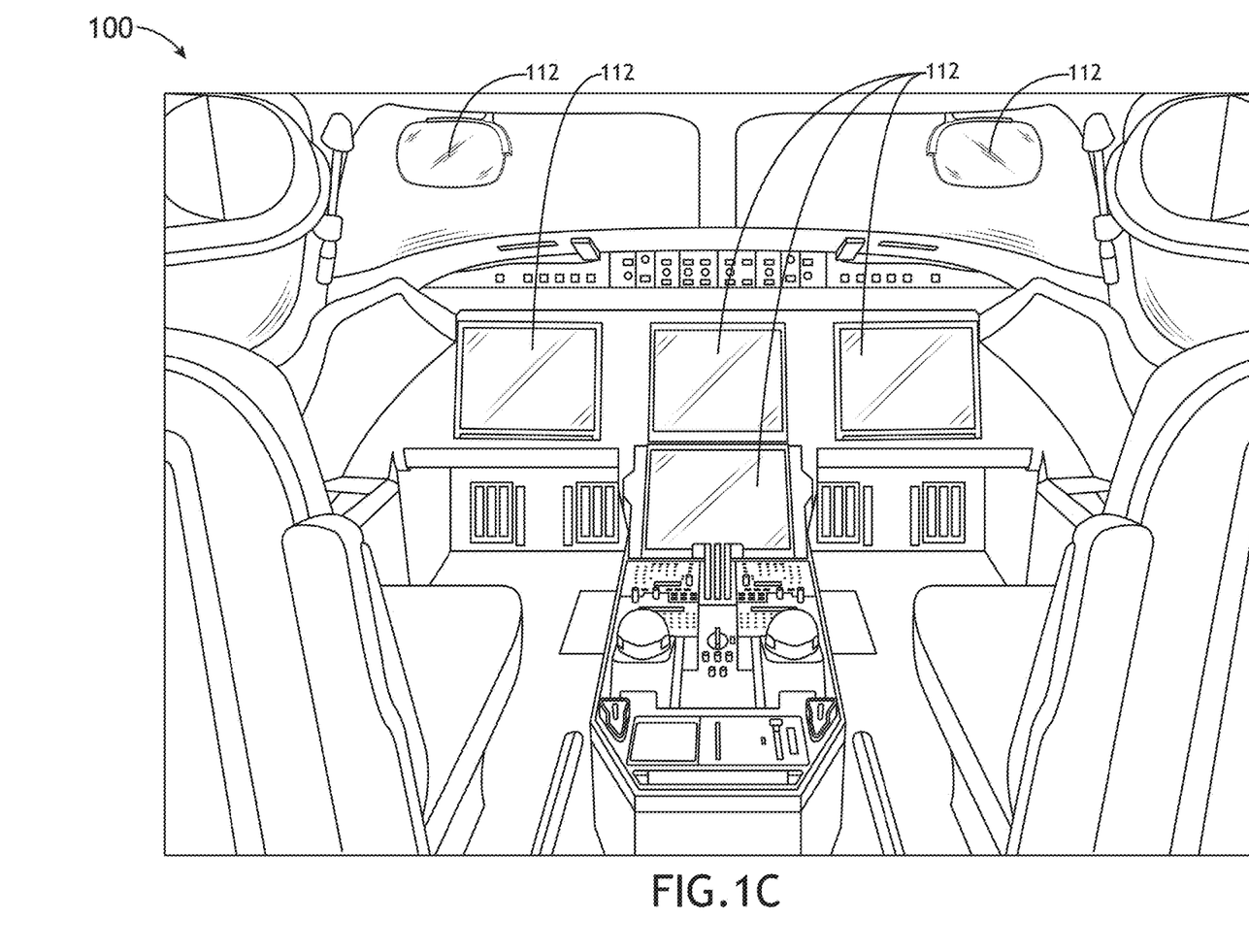
FIG. 1C is an aircraft in which a graphical depiction of insufficient system integrity for low-visibility synthetic vision system taxi mode may be displayed, in accordance with one or more embodiments of the disclosure.

FIGS. 1A-1C generally illustrate an aircraft 100 in which a graphical depiction of insufficient system integrity for low-visibility synthetic vision system taxi mode may be generated and/or displayed, in accordance with one or more embodiments of the disclosure.

Referring now to FIG. 1A, the aircraft 100 may include an aircraft controller 102. The aircraft controller 102 may include one or more processors 104, memory 106 configured to store one or more program instructions 108, and/or one or more communication interfaces 110.

Figure 3:
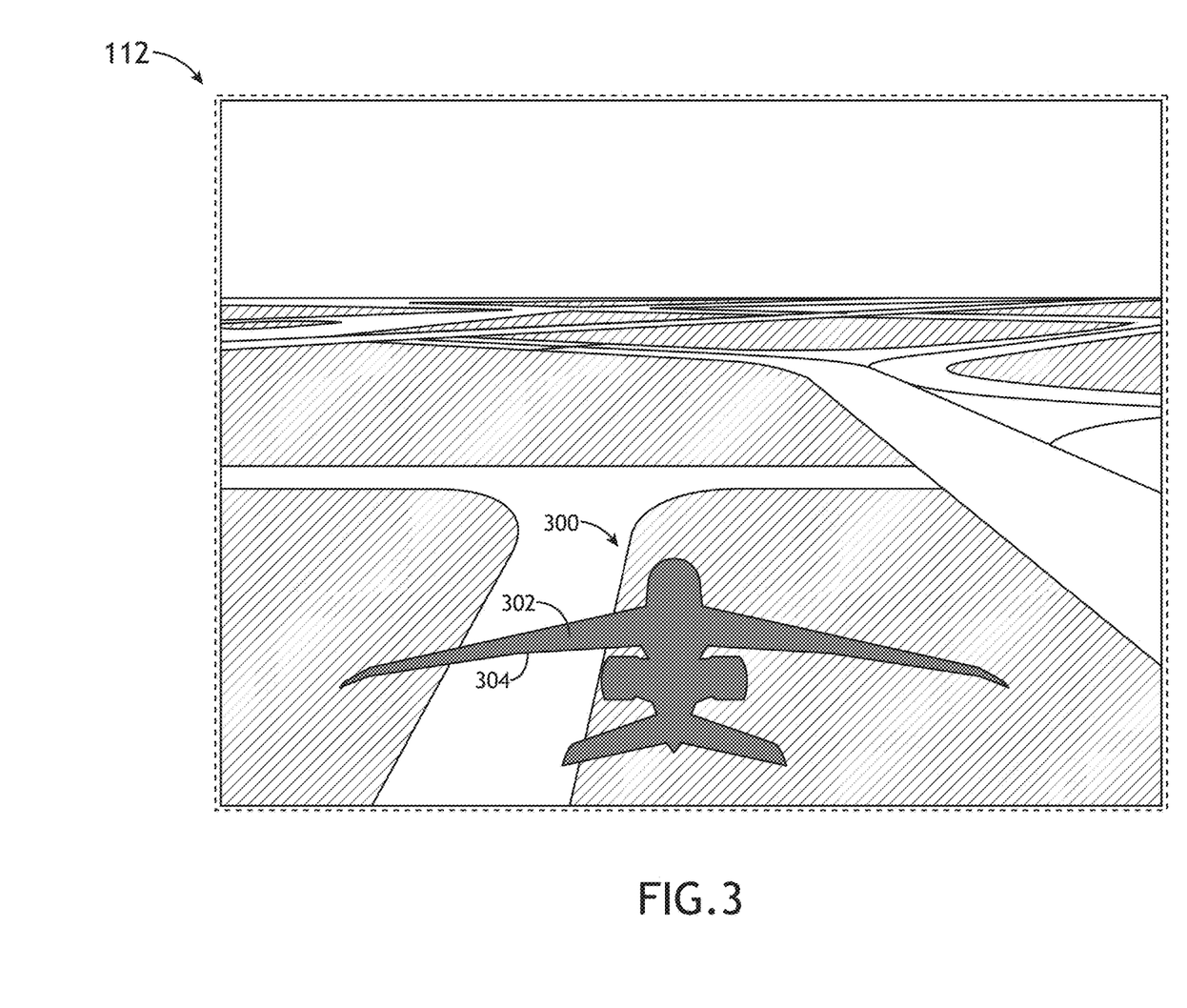
FIG. 3 is a graphical representation of a front view of portions of an avionics display screen showing a graphical depiction of sufficient system integrity for low-visibility synthetic vision system taxi mode, in accordance with one or more embodiments of the disclosure.
Figure 4:
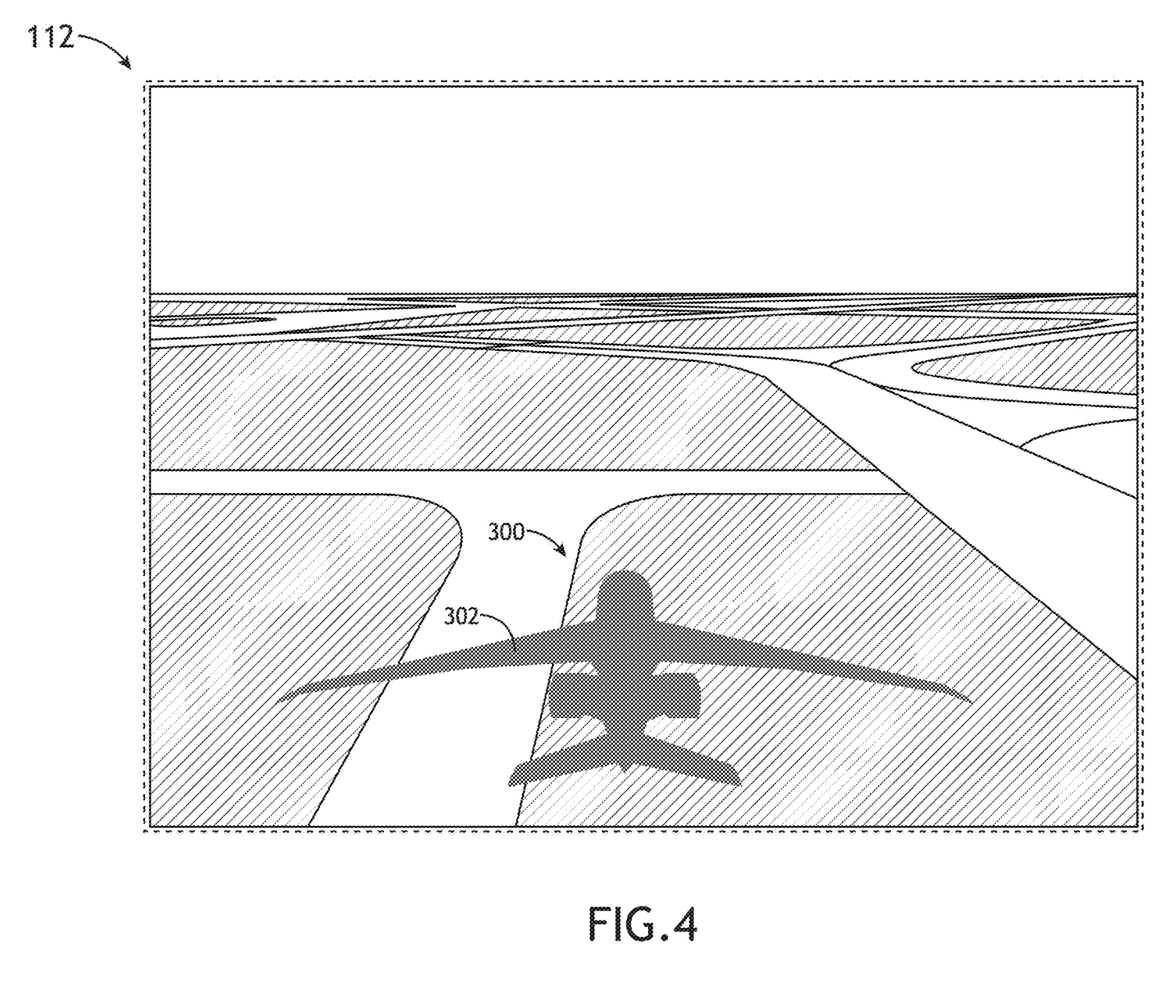
FIG. 4 is a graphical representation of a front view of portions of an avionics display screen showing a graphical depiction of insufficient system integrity for low-visibility synthetic vision system taxi mode, in accordance with one or more embodiments of the disclosure.
Figure 5:
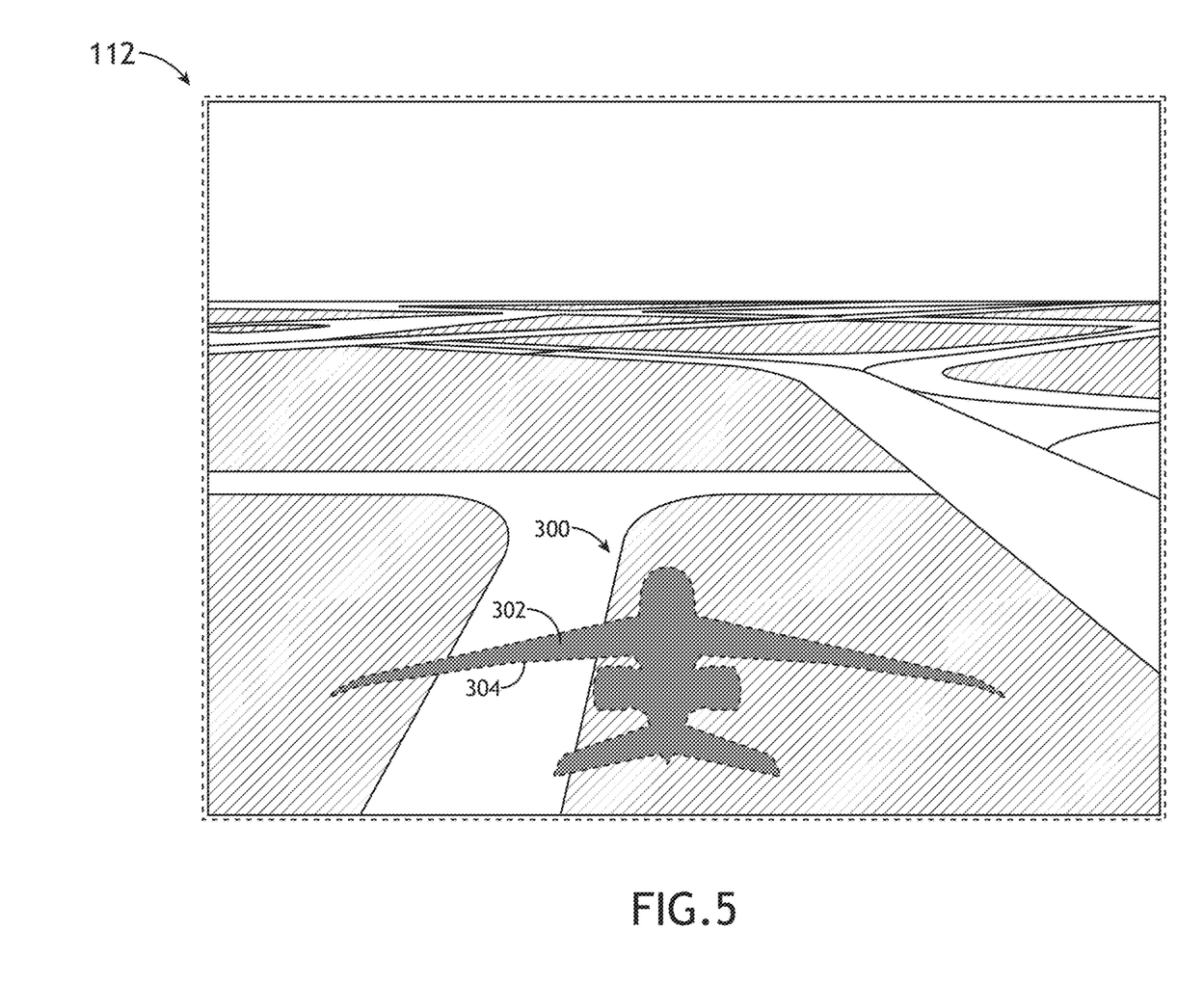
FIG. 5 is a graphical representation of a front view of portions of an avionics display screen showing a graphical depiction of insufficient system integrity for low-visibility synthetic vision system taxi mode, in accordance with one or more embodiments of the disclosure.

The aircraft 100 may include an avionics environment such as, but not limited to, a cockpit. The aircraft controller 102 may be coupled (e.g., physically, electrically, and/or communicatively) to one or more display devices 112. The one or more display devices 112 may be configured to display three-dimensional images (e.g., as part of a Synthetic Vision System, or SVS) and/or two-dimensional images. Referring now to FIGS. 1B and 1C, the avionics environment (e.g., the cockpit) may include any number of display devices 112 (e.g., one, two, three, or more displays) such as, but not limited to, one or more head-down displays (HDDs) 112, one or more head-up displays (HUDs) 112, one or more multi-function displays (MFDs), or the like. For example, select display devices 112 may be considered primary display devices 112 (e.g., primary flight displays, or PFDs), and select additional display devices 112 may be considered secondary display devices 112. For instance, the primary display devices 112 may be configured to display an aircraft ownship symbol 300, as illustrated in FIGS. 3, 4, and 5, while the select additional display devices 112 may be configured to display one or more secondary symbols and/or one or more textual indicators paired with one or more modifications to the aircraft ownship symbol 300, where the paired secondary symbols and/or textual indicators define an insufficient system integrity. The one or more display devices 112 may be employed to present flight data including, but not limited to, situational awareness data and/or flight queue data to a pilot or other crew member. For example, the situational awareness data may be based on, but is not limited to, aircraft performance parameters, aircraft performance parameter predictions, sensor readings, alerts, or the like.

Referring again to FIG. 1A, the aircraft controller 102 may be coupled (e.g., physically, electrically, and/or communicatively) to one or more user input devices 114. The one or more display devices 112 may be coupled to the one or more user input devices 114. For example, the one or more display devices 112 may be coupled to the one or more user input devices 114 by a transmission medium that may include wireline and/or wireless portions. The one or more display devices 112 may include and/or be configured to interact with one or more user input devices 114.

The one or more display devices 112 and the one or more user input devices 114 may be standalone components within the aircraft 100. It is noted herein, however, that the one or more display devices 112 and the one or more user input devices 114 may be integrated within one or more common user interfaces 116.

Where the one or more display devices 112 and the one or more user input devices 114 are housed within the one or more common user interfaces 116, the aircraft controller 102, one or more offboard controllers 124, and/or the one or more common user interfaces 116 may be standalone components. It is noted herein, however, that the aircraft controller 102, the one or more offboard controllers 124, and/or the one or more common user interfaces 116 may be integrated within one or more common housings or chassis.

The aircraft controller 102 may be coupled (e.g., physically, electrically, and/or communicatively) to and configured to receive data from one or more aircraft sensors 118. The one or more aircraft sensors 118 may be configured to sense a particular condition(s) external or internal to the aircraft 100 and/or within the aircraft 100. The one or more aircraft sensors 118 may be configured to output data associated with particular sensed condition(s) to one or more components/systems onboard the aircraft 100. Generally, the one or more aircraft sensors 118 may include, but are not limited to, one or more inertial measurement units, one or more airspeed sensors, one or more radio altimeters, one or more flight dynamic sensors (e.g., sensors configured to sense pitch, bank, roll, heading, and/or yaw), one or more weather radars, one or more air temperature sensors, one or more surveillance sensors, one or more air pressure sensors, one or more engine sensors, and/or one or more optical sensors (e.g., one or more cameras configured to acquire images in an electromagnetic spectrum range including, but not limited to, the visible light spectrum range, the infrared spectrum range, the ultraviolet spectrum range, or any other spectrum range known in the art).

The aircraft controller 102 may be coupled (e.g., physically, electrically, and/or communicatively) to and configured to receive data from one or more navigational systems 120. The one or more navigational systems 120 may be coupled (e.g., physically, electrically, and/or communicatively) to and in communication with one or more global positioning system (GPS) satellites 122, which may provide vehicular location data (e.g., aircraft location data) to one or more components/systems of the aircraft 100. For example, the one or more navigational systems 120 may be implemented as a global navigation satellite system (GNSS) device, and the one or more GPS satellites 122 may be implemented as GNSS satellites. The one or more navigational systems 120 may include a GPS receiver and a processor. For example, the one or more navigational systems 120 may receive or calculate location data from a sufficient number (e.g., at least four) of GPS satellites 122 in view of the aircraft 100 such that a GPS solution may be calculated.

It is noted herein the one or more aircraft sensors 118 may operate as a navigation device 120, being configured to sense any of various flight conditions or aircraft conditions typically used by aircraft and output navigation data (e.g., aircraft location data, aircraft orientation data, aircraft direction data, aircraft speed data, and/or aircraft acceleration data). For example, the various flight conditions or aircraft conditions may include altitude, aircraft location (e.g., relative to the earth), aircraft orientation (e.g., relative to the earth), aircraft speed, aircraft acceleration, aircraft trajectory, aircraft pitch, aircraft bank, aircraft roll, aircraft yaw, aircraft heading, air temperature, and/or air pressure. By way of another example, the one or more aircraft sensors 118 may provide aircraft location data and aircraft orientation data, respectively, to the one or more processors 104, 126.

The aircraft controller 102 of the aircraft 100 may be coupled (e.g., physically, electrically, and/or communicatively) to one or more offboard controllers 124. For example, the one or more offboard controllers 124 may be in possession of an air traffic control tower, in possession of an offboard ground maintenance crew, in possession of a manufacturing line operator, in possession of a quality control tester, or the like.

The one or more offboard controllers 124 may include one or more processors 126, memory 128 configured to store one or more programs instructions 130 and/or one or more thresholds 132, and/or one or more communication interfaces 134. The one or more thresholds 132 may be transmitted to the aircraft controller 102.

The aircraft controller 102 and/or the one or more offboard controllers 124 may be coupled (e.g., physically, electrically, and/or communicatively) to one or more satellites 136. For example, the aircraft controller 102 and/or the one or more offboard controllers 124 may be coupled (e.g., physically, electrically, and/or communicatively) to one another via the one or more satellites 136. For instance, at least one component of the aircraft controller 102 may be configured to transmit data to and/or receive data from at least one component of the one or more offboard controllers 124, and vice versa. By way of another example, at least one component of the aircraft controller 102 may be configured to record event logs and may transmit the event logs to at least one component of the one or more offboard controllers 124, and vice versa. By way of another example, at least one component of the aircraft controller 102 may be configured to receive information and/or commands from the at least one component of the one or more offboard controllers 124, either in response to (or independent of) the transmitted event logs, and vice versa.

It is noted herein that the aircraft 100 and the components onboard the aircraft 100, the one or more offboard controllers 124, the one or more GPS satellites 122, and/or the one or more satellites 136 may be considered components of a system 138, for purposes of the present disclosure.

The one or more processors 104, 126 may include any one or more processing elements, micro-controllers, circuitry, field programmable gate array (FPGA) or other processing systems, and resident or external memory for storing data, executable code, and other information accessed or generated by the aircraft controller 102 and/or the one or more offboard controllers 124. In this sense, the one or more processors 104, 126 may include any microprocessor device configured to execute algorithms and/or program instructions. It is noted herein, however, that the one or more processors 104, 126 are not limited by the materials from which it is formed or the processing mechanisms employed therein and, as such, may be implemented via semiconductor(s) and/or transistors (e.g., using electronic integrated circuit (IC) components), and so forth. In general, the term "processor" may be broadly defined to encompass any device having one or more processing elements, which execute a set of program instructions from a non-transitory memory medium (e.g., the memory), where the set of program instructions is configured to cause the one or more processors to carry out any of one or more process steps.

The memory 106, 128 may include any storage medium known in the art suitable for storing the set of program instructions executable by the associated one or more processors. For example, the memory 106, 128 may include a non-transitory memory medium. For instance, the memory 106, 128 may include, but is not limited to, a read-only memory (ROM), a random access memory (RAM), a magnetic or optical memory device (e.g., disk), a magnetic tape, a solid state drive, flash memory (e.g., a secure digital (SD) memory card, a mini-SD memory card, and/or a micro-SD memory card), universal serial bus (USB) memory devices, and the like. The memory 106, 128 may be configured to provide display information to the display device (e.g., the one or more display devices 112). In addition, the memory 106, 128 may be configured to store user input information from a user input device of a user interface. The memory 106, 128 may be housed in a common controller housing with the one or more processors. The memory 106, 128 may, alternatively or in addition, be located remotely with respect to the spatial location of the processors and/or a controller. For instance, the one or more processors and/or the controller may access a remote memory (e.g., server), accessible through a network (e.g., internet, intranet, and the like).

The aircraft controller 102 and/or the one or more offboard controllers 124 may be configured to perform one or more process steps, as defined by the one or more sets of program instructions 108, 130. The one or more process steps may be performed iteratively, concurrently, and/or sequentially. The one or more sets of program instructions 108, 130 may be configured to operate via a control algorithm, a neural network (e.g., with states represented as nodes and hidden nodes and transitioning between them until an output is reached via branch metrics), a kernel-based classification method, a Support Vector Machine (SVM) approach, canonical-correlation analysis (CCA), factor analysis, flexible discriminant analysis (FDA), principal component analysis (PCA), multidimensional scaling (MDS), principal component regression (PCR), projection pursuit, data mining, prediction-making, exploratory data analysis, supervised learning analysis, boolean logic (e.g., resulting in an output of a complete truth or complete false value), fuzzy logic (e.g., resulting in an output of one or more partial truth values instead of a complete truth or complete false value), or the like. For example, in the case of a control algorithm, the one or more sets of program instructions 108, 130 may be configured to operate via proportional control, feedback control, feedforward control, integral control, proportional-derivative (PD) control, proportional-integral (PI) control, proportional-integral-derivative (PID) control, or the like.

The one or more communication interfaces 110, 134 may be operatively configured to communicate with one or more components of the aircraft controller 102 and/or the one or more offboard controllers 124. For example, the one or more communication interfaces 110, 134 may also be coupled (e.g., physically, electrically, and/or communicatively) with the one or more processors 104, 126 to facilitate data transfer between components of the one or more components of the aircraft controller 102 and/or the one or more offboard controllers 124 and the one or more processors 104, 126. For instance, the one or more communication interfaces 110, 134 may be configured to retrieve data from the one or more processors 104, 126, or other devices, transmit data for storage in the memory 106, 128, retrieve data from storage in the memory 106, 128, or the like. By way of another example, the aircraft controller 102 and/or the one or more offboard controllers 124 may be configured to receive and/or acquire data or information from other systems or tools by a transmission medium that may include wireline and/or wireless portions. By way of another example, the aircraft controller 102 and/or the one or more offboard controllers 124 may be configured to transmit data or information (e.g., the output of one or more procedures of the inventive concepts disclosed herein) to one or more systems or tools by a transmission medium that may include wireline and/or wireless portions (e.g., a transmitter, receiver, transceiver, physical connection interface, or any combination). In this regard, the transmission medium may serve as a data link between the aircraft controller 102 and/or the one or more offboard controllers 124 and the other subsystems (e.g., of the aircraft 100 and/or the system 138). In addition, the aircraft controller 102 and/or the one or more offboard controllers 124 may be configured to send data to external systems via a transmission medium (e.g., network connection).

The one or more display devices 112 may include any display device known in the art. For example, the display devices 112 may include, but are not limited to, one or more head-down displays (HDDs), one or more HUDs, one or more multi-function displays (MFDs), or the like. For instance, the display devices 112 may include, but are not limited to, a liquid crystal display (LCD), a light-emitting diode (LED) based display, an organic light-emitting diode (OLED) based display, an electroluminescent display (ELD), an electronic paper (E-ink) display, a plasma display panel (PDP), a display light processing (DLP) display, or the like. Those skilled in the art should recognize that a variety of display devices may be suitable for implementation in the present invention and the particular choice of display device may depend on a variety of factors, including, but not limited to, form factor, cost, and the like. In a general sense, any display device capable of integration with the user input device (e.g., touchscreen, bezel mounted interface, keyboard, mouse, trackpad, and the like) is suitable for implementation in the present invention.

The one or more user input devices 114 may include any user input device known in the art. For example, the user input device 114 may include, but is not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device, or the like. In the case of a touchscreen interface, those skilled in the art should recognize that a large number of touchscreen interfaces may be suitable for implementation in the present invention. For instance, the display device may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention. In another embodiment, the user input device may include, but is not limited to, a bezel mounted interface.

Figure 2:
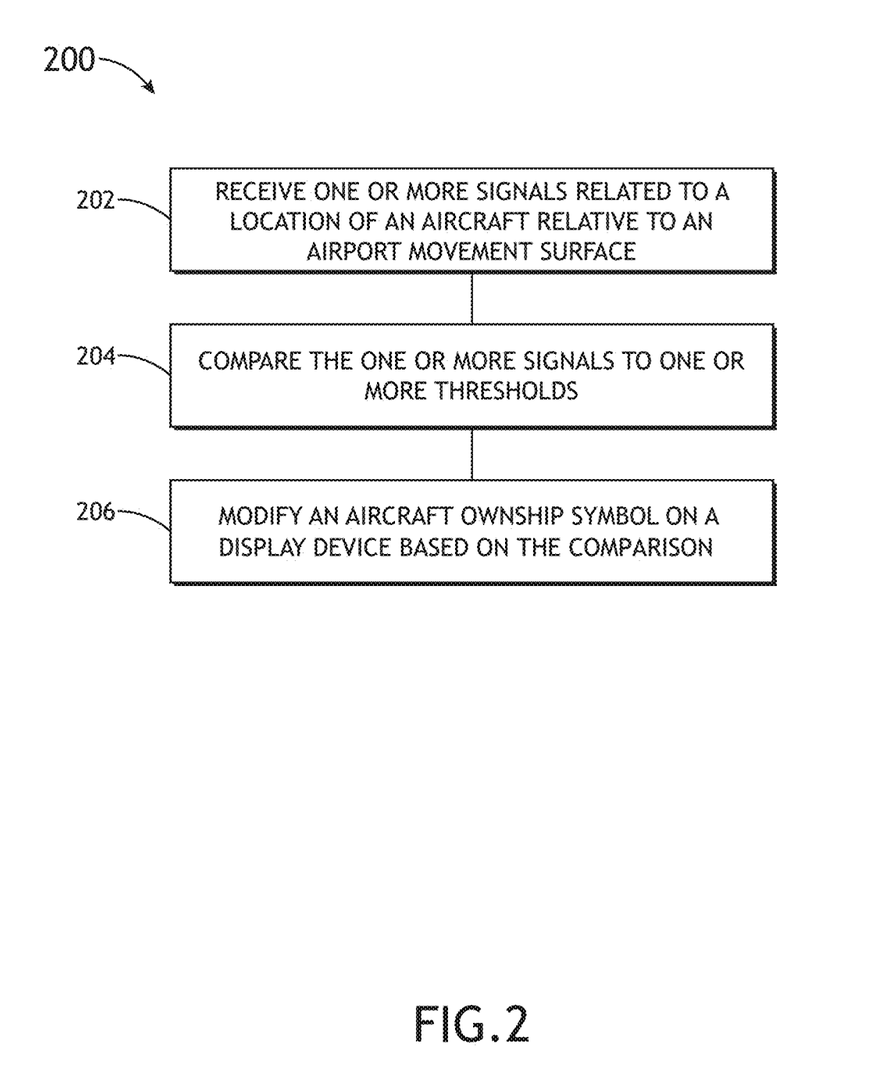
FIG. 2 is a flow diagram of a method or process for generating a graphical depiction of insufficient system integrity for low-visibility synthetic vision system taxi mode, in accordance with one or more embodiments of the disclosure.

FIG. 2 illustrates a flow diagram for a graphical representation of a front view of portions of an avionics display screen showing a graphical depiction of insufficient system integrity for low-visibility synthetic vision system taxi mode, in accordance with one or more embodiments of the disclosure. FIGS. 3-5 generally illustrate graphical representations of a front view of portions of an avionics display screen showing a graphical depiction of insufficient system integrity for low-visibility synthetic vision system taxi mode, in accordance with one or more embodiments of the disclosure.

A low-visibility situation may prevent crew members from being able to see taxi signage at taxiway and runway intersections via line-of-sight through the windows during taxiing. A Taxi Mode for a Synthetic Vision System (SVS) may be employed to assist in determining the location of the aircraft during taxiing. SVS Taxi Mode may provide situational awareness to crew members operating an aircraft by using databases including terrain, obstacle, geo-political, hydrological, or other environment information to generate graphical representations of the surrounding area during taxiing. As such, it would be desirable to provide a graphical depiction of insufficient system integrity for low-visibility SVS taxi mode.

A graphical depiction of insufficient system integrity for low-visibility SVS Taxi Mode may be provided in accordance with guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), International Civil Aviation Organization (ICAO), or any other standards setting organization or company; the Radio Technical Commission for Aeronautics (RTCA) or any other guidelines agency or organization; or the like.

Select SVS systems display an aircraft ownship symbol on a primary display device 112 representing the position of the aircraft ownship with regards to the depicted airport movement surface. For example, the aircraft ownship symbol may include an outlined representation of the aircraft 100 imposed over the airport movement surface on the display device 112.

Select methods for displaying sufficient or insufficient system integrity for low-visibility SVS Taxi Mode include a circle with a defined radius, where a smaller radius indicates a higher degree of confidence in an accuracy of one or more symbols received that are related to a location of an aircraft relative to an airport movement surface. It is noted herein, however, that a small enough circle may be covered by the aircraft ownship symbol such that the degree of confidence in the accuracy of one or more symbols received that are related to the location of an aircraft is not readily or easily discernable.

Where the aircraft ownship symbol is already used on the primary display device 112, it may be possible to modify the ownship symbol to be a graphical depiction of insufficient system integrity for low-visibility SVS Taxi Mode. It is believed that generating a graphical depiction of insufficient system integrity for low-visibility SVS Taxi Mode in the form of modified symbology (e.g., a modified aircraft ownship symbol) for display on the one or more display devices 112 may result in an intuitive means of conveying the position of the aircraft ownship with regards to the depicted airport movement surface. It is noted herein that the modified symbology may be complemented by a message and/or other symbology displayed on a secondary display device 112, allowing for a primary display device 112 including the aircraft ownship symbol to remain decluttered.

Referring now to FIG. 2, a method or process 200 for generating a graphical depiction of insufficient system integrity for low-visibility SVS Taxi Mode is disclosed, in accordance with one or more embodiments of the disclosure. The aircraft controller 102 may employ a series of algorithms to generate the graphical depiction of insufficient system integrity for low-visibility SVS Taxi Mode. The series of algorithms may be process steps as defined by the one or more sets of program instructions 108.

In a step 202, one or more signals related to a location of an aircraft relative to an airport movement surface may be received. For example, the one or more signals may be received from the one or more GPS satellites 122 (e.g., via the one or more navigation systems 120 of the aircraft 100). By way of another example, the one or more signals may be received from the one or more offboard controllers 124 (e.g., either indirectly via the one or more satellites 136 or directly).

In a step 204, the one or more signals may be compared to one or more thresholds. The series of algorithms may compare the one or more signals to one or more thresholds 132, where each threshold may represent a degree of accuracy (e.g., integrity, confidence, or the like) in whether the one or more signals accurately indicate the location of the aircraft relative to the airport movement surface (e.g., the airport movement surface itself and/or one or more structures (e.g., signs, poles, buildings, or the like) positioned on the airport movement surface). The one or more thresholds 132 may be received by the aircraft controller 102 of the aircraft 100. The aircraft controller 102 may be configured to store the one or more thresholds 132 (e.g., within memory 106). The one or more thresholds 132 may be pre-loaded onto the aircraft controller 102 prior to a flight (e.g., between flights, during in-field testing or operation of the aircraft 100, during manufacture and/or factory-floor testing of the aircraft 100, or the like). The aircraft controller 102 may be configured to receive the one or more thresholds 132 from an offboard controller 124 during a portion of a flight.

In a step 206, an aircraft ownship symbol on a display device of the aircraft may be modified based on the comparison of the one or more signals to the one or more thresholds. The series of algorithms may modify an aircraft ownship symbol 300 to reflect a state of degradation of the system integrity. For example, the one or more thresholds may be for a horizontal figure of merit (HFOM) value. For instance, where the HFOM threshold is a negative marker (e.g., is a threshold of uncertainty), exceeding the HFOM threshold may cause an aircraft ownship symbol 300 (e.g., as illustrated in FIGS. 3-5) to be modified to illustrate the state of degradation. In addition, where the HFOM threshold is a positive marker (e.g., is a threshold of certainty), failing to meet the HFOM threshold may result in the aircraft ownship symbol 300 (e.g., as illustrated in FIGS. 3-5) to be modified to illustrate the state of degradation.

As illustrated in FIG. 3, the aircraft ownship symbol 300 may include an interior portion 302 of or having a first color, the interior portion 302 being bounded by an outline 304 of or having a second color. For example, the interior portion 302 may be opaque or substantially opaque when there is sufficient system integrity (e.g., when the comparison indicates there is sufficient system integrity in the degree of confidence in the location of the aircraft relative to the airport movement surface). By way of another example, the interior portion 302 and/or the outline 304 may be static when there is sufficient system integrity (e.g., when the comparison indicates there is sufficient system integrity in the degree of confidence in the location of the aircraft relative to the airport movement surface).

When the comparison indicates there is sufficient system integrity in the degree of confidence in the location of the aircraft relative to the airport movement surface, the series of algorithms may modify the aircraft ownship symbol 300 in any number of ways or combination of ways to illustrate a state of degradation for insufficient system integrity.

As illustrated in FIG. 4, in one example the interior 302 may be partially-faded from opaque or substantially opaque (e.g., as illustrated in FIG. 3) to translucent. By way of another example, the interior 302 of the aircraft ownship symbol 300 may be changed to one or more different colors. For instance, each threshold level may be represented by a color (e.g., yellow for caution, red for severe caution, or the like) different from the color of the interior 302 (e.g., as illustrated in FIG. 3) displayed when there is sufficient system integrity. In addition, a particular threshold level may be represented by multiple colors (e.g., in a striped or dotted pattern within the boundaries of the aircraft ownship symbol). By way of another example, the interior portion 302 of the aircraft ownship symbol 300 may be animated (e.g., may be modified to flash, pulse, blink, or the like). For instance, each threshold level may be represented by a select brightness, rapidness, or pattern of animation (e.g., flashing, pulsing, blinking, or the like) different from the static interior portion 302 (e.g., as illustrated in FIG. 3) displayed when there is sufficient system integrity.

As illustrated in FIG. 5, in one example the outline 304 of the aircraft ownship symbol 300 may be removed, leaving only a soft-edged (or feathered-edge) interior 302. By way of another example, the outline 304 of the aircraft ownship symbol 300 may remain but be segmented. By way of another example, the outline 304 of the aircraft ownship symbol 300 may remain and be changed to one or more different colors. For instance, each threshold level may be represented by a color (e.g., yellow for caution, red for severe caution, or the like) different from the color of the outline 304 (e.g., as illustrated in FIG. 3) displayed when there is sufficient system integrity. In addition, a particular threshold level may be represented by a multi-colored outline (e.g., in a segmented pattern within the boundaries of the aircraft ownship symbol). By way of another example, the outline 304 of the aircraft ownship symbol 300 may remain and be animated (e.g., may be modified to flash, pulse, blink, or the like). For instance, each threshold level may be represented by a select brightness, rapidness, or pattern of animation (e.g., flashing, pulsing, blinking, or the like) different from the static outline 304 (e.g., as illustrated in FIG. 3) displayed when there is sufficient system integrity.

Although embodiments of the disclosure illustrate the modifying of the aircraft ownship symbol to be consistent for the entire aircraft 100, it is noted herein that the aircraft ownship symbol 300 may be modified differently. For example, different portions of the interior 302 or the outline 304 may be modified to illustrate more advanced or less advanced states of degradation, depending on the insufficient level of system integrity.

It is noted herein the modifications to the aircraft ownship symbol 300 may be paired with one or more secondary symbols and/or one or more textual indicators displayed on a secondary display device 112. For example, the one or more secondary symbols and/or one or more textual indicators may be placeable in a message box, title bar, or another location on the one or more display devices 112, to prevent a cluttering of the space around the aircraft ownship symbol 300 on the primary display device 112. Therefore, the above description should not be interpreted as a limitation on the scope of the present disclosure but merely an illustration.

It is noted herein the process 200 is not limited to the steps and/or sub-steps provided. The process 200 may include more or fewer steps and/or sub-steps. The process 200 may perform the steps and/or sub-steps simultaneously. The process 200 may perform the steps and/or sub-steps sequentially, including in the order provided or an order other than provided. Therefore, the above description should not be interpreted as a limitation on the scope of the disclosure but merely an illustration.

Although embodiments of the present disclosure are directed to the aircraft controller 102 receiving the one or more thresholds 132 and modifying the aircraft ownship symbol 300 via a series of algorithms that are process steps as defined by the one or more sets of program instructions 108, it is noted herein that the one or more offboard controllers 124 may be configured to modify the aircraft ownship symbol 300 via one or more steps of the process 200, employing a series of algorithms that are process steps as defined by the one or more sets of program instructions 130, before transmitting the modified aircraft ownship symbol 300 to the aircraft controller 102 for display on the one or more display devices 112. Therefore, the above description should not be interpreted as a limitation on the scope of the present disclosure but merely an illustration.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A primary display device displaying a graphical depiction of insufficient system integrity for low-visibility synthetic vision system taxi mode, the graphical depiction including an aircraft ownship symbol,
   the aircraft ownship symbol being modified following a receipt of one or more signals related to a location of the aircraft relative to an aircraft movement surface and a comparison of the one or more signals to one or more thresholds, the comparison being configured to determine whether there is insufficient system integrity in a degree of confidence in the location of the aircraft relative to the airport movement surface,
   the modified aircraft ownship symbol being paired with at least one of one or more secondary symbols or one or more textual indicators displayed on a secondary display device of the aircraft, the at least one of one or more secondary symbols or one or more textual indicators being configured to provide information about the insufficient system integrity in the degree of confidence in the location of the aircraft relative to the airport movement surface.

2. A method comprising:
   receiving one or more signals related to a location of an aircraft relative to an airport movement surface;

comparing the one or more signals to one or more thresholds, the comparison being configured to determine whether there is insufficient integrity in a degree of confidence in the location of the aircraft relative to the airport movement surface; and modifying an aircraft ownship symbol on a primary display device of the aircraft based on the comparison, the modifying the aircraft ownship symbol including pairing the modifications to at least one of one or more secondary symbols or one or more textual indicators displayed on a secondary display device of the aircraft, the at least one of one or more secondary symbols or one or more textual indicators being configured to provide information about the insufficient system integrity in the degree of confidence in the location of the aircraft relative to the airport movement surface.

3. The method of claim 2, the aircraft ownship symbol including an interior portion having a first color when there is sufficient system integrity in the degree of confidence in the location of the aircraft relative to the airport movement surface.

4. The method of claim 3, the interior portion of the aircraft ownship symbol being opaque when there is sufficient system integrity in the degree of confidence in the location of the aircraft relative to the airport movement surface, the modifying the aircraft ownship symbol including changing the interior portion to be translucent when the comparison indicates there is insufficient system integrity in the degree of confidence in the location of the aircraft relative to the airport movement surface.

5. The method of claim 3, the modifying the aircraft ownship symbol including changing the interior portion from the first color to at least a second color when the comparison indicates there is insufficient system integrity in the degree of confidence in the location of the aircraft relative to the airport movement surface.

6. The method of claim 3, the modifying the aircraft ownship symbol including animating the interior portion when the comparison indicates there is insufficient system integrity in the degree of confidence in the location of the aircraft relative to the airport movement surface.

7. The method of claim 6, the animation of the interior portion including at least one of a flashing, a blinking, or a pulsing.

8. The method of claim 3, the interior portion of the aircraft ownship symbol being bounded by an outline having a second color when there is sufficient system integrity in the degree of confidence in the location of the aircraft relative to the airport movement surface.

9. The method of claim 8, the modifying the aircraft ownship symbol including removing the outline bounding the interior portion when the comparison indicates there is insufficient system integrity in the degree of confidence in the location of the aircraft relative to the airport movement surface.

10. The method of claim 8, the modifying the aircraft ownship symbol including changing the outline from the second color to at least a third color when the comparison indicates there is insufficient system integrity in the degree of confidence in the location of the aircraft relative to the airport movement surface.

11. The method of claim 8, the modifying the aircraft ownship symbol including segmenting the outline when the comparison indicates there is insufficient system integrity in the degree of confidence in the location of the aircraft relative to the airport movement surface.

12. The method of claim 8, the modifying the aircraft ownship symbol including animating the outline when the comparison indicates there is insufficient system integrity in the degree of confidence in the location of the aircraft relative to the airport movement surface.

13. The method of claim 12, the animation of the outline including at least one of a flashing, a blinking, or a pulsing.

14. The method of claim 2, the one or more thresholds including a horizontal figure of merit threshold.

* * * * *